US010248378B2

(12) United States Patent
Nieuwenhuys et al.

(10) Patent No.: US 10,248,378 B2
(45) Date of Patent: Apr. 2, 2019

(54) DYNAMICALLY INSERTING ADDITIONAL CONTENT ITEMS TARGETING A VARIABLE DURATION FOR A REAL-TIME CONTENT STREAM

(71) Applicant: AdsWizz Inc., San Mateo, CA (US)

(72) Inventors: Bruno Nieuwenhuys, Sunnyvale, CA (US); Bogdan Bocse, Bucharest (RO); Mihai Ciurea, Bucharest (RO)

(73) Assignee: ADSWIZZ INC., San Mateo, CA (US)

( * ) Notice: Subject to any disclaimer, the term of this patent is extended or adjusted under 35 U.S.C. 154(b) by 0 days.

(21) Appl. No.: 15/204,986

(22) Filed: Jul. 7, 2016

(65) Prior Publication Data
US 2017/0131967 A1    May 11, 2017

(30) Foreign Application Priority Data

Nov. 11, 2015 (RO) .............................. A/00811/2015

(51) Int. Cl.
H04N 7/10          (2006.01)
H04N 7/025         (2006.01)
G06F 3/16          (2006.01)
H04L 29/06         (2006.01)
H04N 21/233        (2011.01)
(Continued)

(52) U.S. Cl.
CPC .......... G06F 3/165 (2013.01); H04L 65/1083 (2013.01); H04L 65/60 (2013.01); H04L 65/602 (2013.01); H04L 65/80 (2013.01); H04N 21/233 (2013.01); H04N 21/812 (2013.01); H04L 67/10 (2013.01)

(58) Field of Classification Search
CPC ..... H04L 67/10; H04L 65/60; H04N 7/17318; H04N 7/165; H04N 21/812; H04N 21/4331; H04N 21/435; H04N 21/4532
USPC ......... 709/203; 381/77; 725/88, 90, 102, 32, 725/34, 35
See application file for complete search history.

(56) References Cited

U.S. PATENT DOCUMENTS 6,505,169 B1    1/2003  Bhagavath et al.
8,683,547 B2 *  3/2014  Apparao ................ G06Q 10/06
                                                        705/304
(Continued)

OTHER PUBLICATIONS

PCT International Search Report and Written Opinion, PCT Application No. PCT/US2016/061655, dated Jan. 6, 2017, 12 pages.

Primary Examiner — Paul Kim
Assistant Examiner — Ubachukwu A Odunukwe
(74) Attorney, Agent, or Firm — Fenwick & West LLP

(57) ABSTRACT

A content replacement system identifies regular content replacement parts and alternative content replacement parts, each alternative content replacement part being a content item with a duration within one of a plurality of ranges. The system detects a start of a content replacement break in a listener content stream, the listener content stream shifted by a listener delay value from a live content stream. The system inserts the regular content replacement parts into the stream. The system detects an end of the content replacement break for the listener content stream, and selects one of the alternative content replacement parts to insert into the listener content stream, the selected alternative content replacement part having a duration that when inserted into the listener content stream minimizes a difference between the listener delay value and a target delay value.

20 Claims, 7 Drawing Sheets

(51) Int. Cl.
    *H04N 21/81*    (2011.01)
    *H04L 29/08*    (2006.01)

(56) References Cited

U.S. PATENT DOCUMENTS

| | | | |
|---|---|---|---|
| 8,996,712 B2* | 3/2015 | Green | H04L 67/02 |
| | | | 707/711 |
| 2007/0204310 A1 | 8/2007 | Hua et al. | |
| 2010/0251289 A1* | 9/2010 | Agarwal | H04N 7/16 |
| | | | 725/34 |
| 2014/0074959 A1* | 3/2014 | Alsina | H04H 60/46 |
| | | | 709/213 |
| 2014/0096169 A1* | 4/2014 | Dodson | H04N 21/262 |
| | | | 725/97 |
| 2014/0181243 A1 | 6/2014 | Nieuwenhuys | |
| 2014/0259059 A1 | 9/2014 | Evans et al. | |
| 2015/0052196 A1* | 2/2015 | Emerson, III | H04L 67/10 |
| | | | 709/203 |

* cited by examiner

DYNAMICALLY INSERTING ADDITIONAL CONTENT ITEMS TARGETING A VARIABLE DURATION FOR A REAL-TIME CONTENT STREAM

CROSS REFERENCE TO RELATED APPLICATION

This application claims the benefit of Romanian App. No. A/00811/2015, filed Nov. 11, 2015, which is incorporated by reference in its entirety.

TECHNICAL FIELD

The disclosure generally relates to the field of real-time audio processing, and specifically to dynamically inserting additional content items targeting a variable duration for a real-time content stream.

BACKGROUND

One type of distribution of content items popular on the Internet is the real-time distribution of audio streams to listeners. As used here, real-time refers to a situation where the audio stream is presented without substantial delay to the listeners as the audio stream is being produced (e.g., by a publisher). This may otherwise be referred to as a live content stream, or a live audio stream. However, compared to the presentation of live content using traditional means, such as via a radio broadcast, the presentation of a live audio stream over the Internet presents substantial challenges with regards to modification of the live audio stream. While in a traditional broadcast, such as a live broadcast of a sporting event, the modification of the broadcast stream (e.g., via insertion or replacement with other content) does not affect the content of the stream as heard (i.e., consumed) by the listeners, as every listener receives the same audio stream.

However, in the case of a live content stream broadcast over the Internet, an opportunity arises to provide additional interactivity and richer content, resulting in the ability to customize a content stream for individuals. This may be achieved by inserting customized content within certain content replacement break points specified within a live audio broadcast (e.g., during a timeout in a broadcast of a sports event). However, the insertion or replacement of content in a live content stream, especially when the duration of the content break may vary and is not known, may cause substantial issues with delay and differences in this delay between different listeners. This may not be desirable in many live audio streams and cause a decrease in the number of listeners of the broadcast.

For example, the live audio stream may be a broadcast of a sporting event, and different listeners receive different customized content inserted within content breaks of varying durations. This may cause the live audio stream to be presented to each listener differently. These differences may cause some listeners to hear about a significant event in the broadcast (e.g., a goal) after other listeners. Such issues may cause a listener to discontinue listening to the live audio stream, decreasing listenership for the content provider providing the live audio stream.

Thus, what was lacking, inter alia, was an ability for presenting customized live audio streams to users with content presented at substantially similar timeframes.

SUMMARY

In the context of over-the-Internet media streaming, when live transmissions are concerned, it may be important to control the delay between the live transmission time and the individual user times and to keep it as short as possible. This can be done by preparing any inserted content items in advance to have a duration that matches the duration of a content replacement break as much as possible. However, if the duration of the content break is not previously known, a system would not be able to match the duration of the ads content with the content break beforehand. In order to ensure that no dead air reaches the user, the replaced content segment should not end before detection of the signal for end of the content break. This may lead to increased delay between a live content stream and the listener's content stream.

To resolve the issue of dead air and/or delay, replacement content may be inserted into a content break and arranged within a live content stream. This maximizes the use of the replacement content that can be inserted into the content break while also preserving a bounded delay between the listener's content stream and the live content stream.

Insertion of replacement content within a live content stream may be achieved by preparing a first collection of user eligible regular content replacement parts before or just after the content break is detected, so as not to produce uncontrolled delays in the transmission, and at the same time prepare a second collection of user eligible alternative content replacement parts, having various durations, with a wide statistical spread of their individual durations, and grouped in sets defined by predetermined duration intervals, used for the selection of the last replacement part (in the content break), in order to minimize the difference between the delay experienced by each user and a target delay set for the system, such that the best overlap of the content break is obtained, and while preserving the user time at or near a target delay behind the real time of the transmission time. When the replacement content is inserted into the content break, the first collection is retrieved first, and the selection of the last replacement part is made from the second collection, based on desired criteria.

The disclosed configuration has a number of advantages. For example, when the delay of for the listeners is close to a target delay, all listeners of the live content stream receive the same content substantially at the same time. This is beneficial in the case of live streams of certain events, such as sporting events, or timed offers or competitions (e.g., "the first 10 callers receive a free prize!"). Furthermore, if a listener were to disconnect from the stream due to connection issues or other concerns, when reconnecting, the difference in the content presented may be minimized, as the listener was previously at delay from the live content stream that was near the target delay value.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
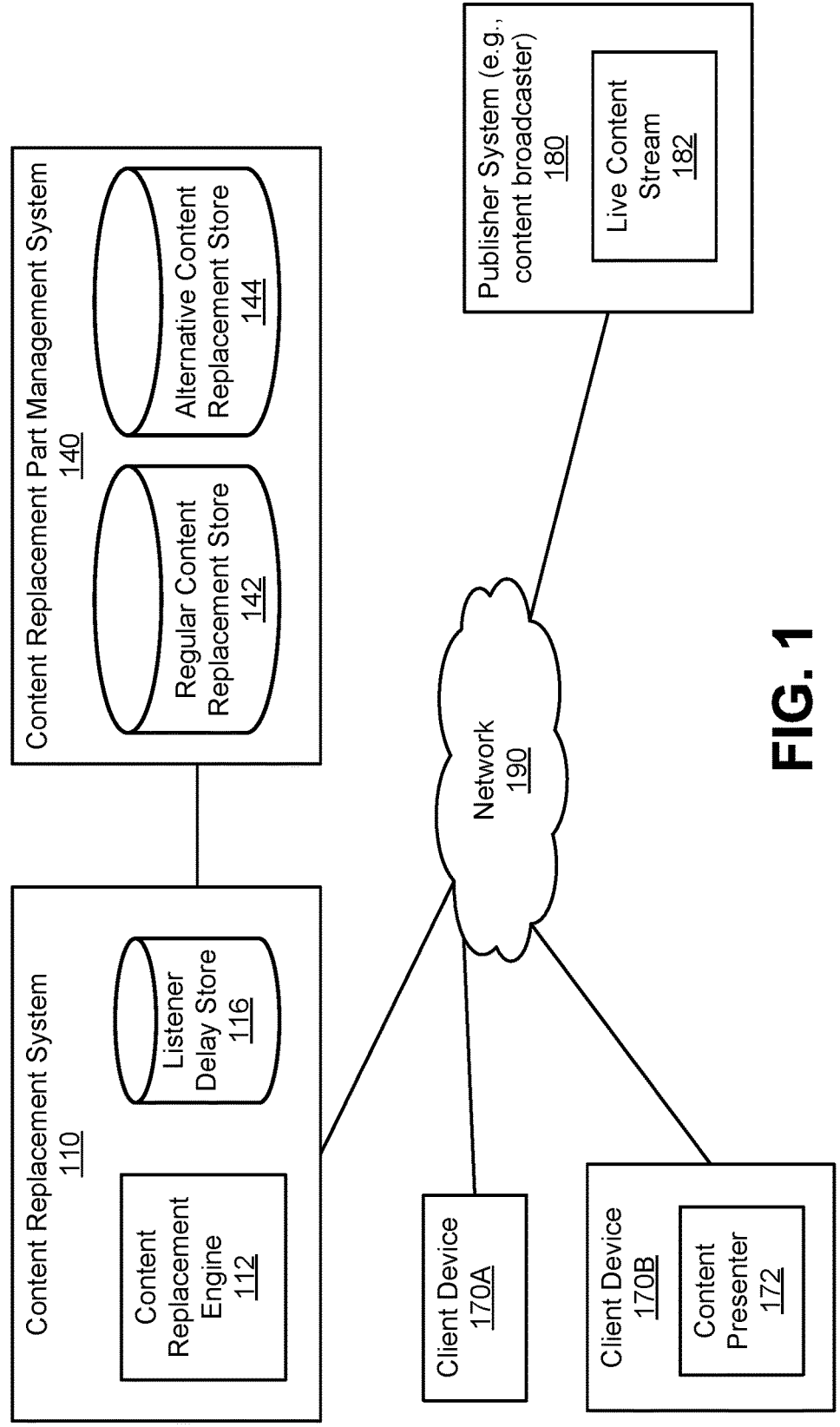
FIG. 1 illustrates an example environment 100 for dynamically inserting content in a content stream, according to an embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a system for content replacement in a live content stream. In one embodiment, a content replacement system identifies regular content replacement parts. Each of these regular content replacement parts is a content item from a third party content provider, and each regular content replacement part has durations within a single range of values.

The content replacement system also identifies alternative content replacement parts, with each alternative content replacement part being a content item with a duration within one of a set of consecutive ranges.

The content replacement system detects a start of a content replacement break in a listener content stream provided to a client device. This listener content stream is a content stream that is shifted by a listener delay value from a live content stream. This live content stream is received from a publisher in real-time or near real time.

The content replacement system modifies the listener content stream at the beginning of the content replacement break to insert the regular content replacement parts.

The content replacement system subsequently detects an end of the content replacement break for the listener content stream.

The content replacement system selects one of the alternative content replacement parts to insert into the listener content stream in the content replacement break. The alternative content replacement part that is selected should have a duration, that when inserted into the listener content stream, minimizes the difference between the listener delay value of the listener content stream and a target delay value.

In other words, the duration of the selected alternative content replacement part is meant to align the delay of the listener's content stream with the target delay value specified for the live content stream.

The content replacement system modifies the listener content stream to lastly insert the selected alternative replacement part.

The content replacement system updates the listener delay value for the listener content stream. The content replacement system determines the new listener delay value based on the duration of the inserted content replacement parts.

The content replacement system may in some cases transmit a request to an alternative content replacement parts store for alternative content replacement parts. This request may include the characteristics of the listener and client device, and an indication of the target delay value and the listener delay value. This may allow the alternative content replacement parts store to respond with replacement parts that are compatible for insertion into the content replacement break.

After transmitting the request, the content replacement system may receive from the alternative content replacement parts store one or more alternative content replacement parts, the alternative content replacement parts grouped into one or more sets. Each set has alternative content replacement parts within a range of durations. The range of durations may be selected based on the difference between the target delay value and the listener delay value. As noted, the content replacement part inserts regular content replacement parts, followed by an alternative content replacement part. If the difference between the target delay value and the listener delay value is large, a large range of durations may be selected, while a smaller range of durations may be selected if the difference is small. The alternative content replacement part itself may be selected based on the characteristics of the listener and the client device. For example, the replacement part may be selected based on the location of the content device.

The alternative content replacement parts within each set may be further sorted according to various criteria. These criteria may include a difference between the listener delay value and the target delay value, and a value for the alternative content replacement part to the provider of the alternative content replacement part.

To detect the start of the content replacement break, the content replacement system may identify an audio marker in the listener content stream using spectrum analysis which is at a frequency range beyond a normal human range of hearing. The content replacement system may determine that the audio marker indicates the start of the content replacement break.

The content replacement system may detect at some point that the client device is disconnected from the live content stream. Afterwards, the content replacement system may detect that the client device has reconnected. The content replacement system may access the listener delay value previously stored for the client device and present the listener content stream to the client device shifted from the live content stream by the listener delay value. In this case, the listener is able to resume his or her own stream at the same point as when the listener had disconnected.

The content replacement system may also modify the duration of the content replacement break for the listener content stream by a difference between the listener delay value and the target delay value for the corresponding live content stream. In this way, the updated listener delay value approaches the target delay value after insertion of the content replacement parts in the content replacement break. As the live content stream has multiple content replacement breaks, the duration of subsequent content replacement breaks may be modified to have the delay in the listener content stream target the target delay value.

The content replacement system may also determine a difference in time between the listener content stream and the live content stream, after inserting the alternative content replacement part. The content replacement system may then update the listener delay value with the difference in time between the listener content stream and the live content stream.

Example System for Dynamic Content Insertion

FIG. 1 illustrates an example environment 100 for dynamically inserting content in a content stream, according to an embodiment. The environment 100 includes the network 190, one or more client devices 170, a content replacement system 110, a content replacement part management system 140, and a publisher system 180. Although the illustrated environment 100 may include the elements shown in FIG. 1, in other embodiments the environment 100 may include different elements. Furthermore, the functionalities of each element may be distributed differently among the elements in other embodiments.

Example Network

The network 190, which can be wired, wireless, or a combination thereof, enables communications among the client devices 170 and the content replacement system 110, the content replacement part management system 140, and the publisher system 180, and may include the Internet, a local area network (LAN), virtual LAN (VLAN) (e.g., with VPN), wide area network (WAN), or other network. In one example embodiment, the network 190 uses standard communications technologies and/or protocols, such as Hypertext transfer Protocol (HTTP), Transmission Control Protocol/Internet Protocol (TCP/IP), Uniform Resource Locators (URLs), and the Doman Name System (DNS). In another example embodiment, the entities can use custom and/or dedicated data communications technologies instead of, or in addition to, the ones described above.

Example Client Device

The client devices 170 are electronic devices used by users to perform functions such as consuming digital content, executing software applications, browsing websites hosted by web servers on the network 190, downloading files, and interacting with the container servers 110. For example, the client devices 170 may be dedicated e-readers, smartphones, wearables (e.g., smartwatches or pendants), or tablets, laptops, or desktop computers configured similar to an exemplary machine (or computing system) described with FIG. 7. A client device 170 may include one or more applications, such as a web browser, to interact with services provided by the container servers 110. Although two client devices 170 are illustrated in FIG. 1, in other embodiments the environment 100 includes more client devices 170.

In one embodiment, a client device 170 includes a content presenter 172. This may be a software application executing on the client device 170, may be hardware component of the client device 170, or a combination. The content presenter 172 may submit requests to the content replacement system 110 for a content, such as a live content stream. The content presenter 172 may also request a selection of content streams (e.g., via a search) from the content replacement system 110. The content presenter 172 may select one of the content streams in the selection of content streams. In response to these requests, the content replacement system 110 provides the content presenter 172 with a content stream, which may be a live content stream. The content presenter 172 may present the content stream to a listener of the client device 170.

For example, the client device 170 may be an entertainment system in a vehicle, and the content presenter 172 may be an integrated component in the entertainment system that may request a live content stream via a wireless connection from the content replacement system 110 for presentation to a listener, in this case, the driver or passengers of the vehicle.

Example Publisher System

The publisher system 180 may be configured to transmit content streams, such as live content stream 182, to destination systems, such as the content replacement system 110. The content stream that is transmitted by the publisher system 180 may be created at the publisher system 180, and in the case of a live content stream 182, may be transmitted to the content replacement system 110 substantially at the same time as it is created. The live content stream 182 may be in any format capable of being streamed in real-time, such as MP3. The live content stream 182 may be transmitted to the content replacement system 110 along with metadata, such as a description of the content within the live content stream 182, program or content guide, technical specifications (e.g., format, bit rate), content author, and so on. In one embodiment, instead of being a separate system, the publisher system 180 is party of the same system as the content replacement system 110.

In addition, the live content stream 182 may include one or more indicators that specify a content replacement break in the live content stream 182 suitable for content replacement. Each content replacement break is a section of the live content stream 182 that may be specified by a start point indicator and an end point indicator. These indicators may be transmitted along with the live content stream 182, either within the metadata of the live content stream 182 or within the live content stream 182 itself.

In the case where the indicators are transmitted in the metadata, the publisher 180 may insert a specific, digital marker (digital flag) in the digitally encoded frame of the live content stream 182 to represent a start and an end of the content replacement break section. Such digital flag must be permitted by the chosen digital encoding format of the live content stream 182 without altering the playback sound and without corrupting the format of the protocol. In one embodiment, the live content stream 182 uses an MPEG (Moving Pictures Experts Group) format, and the publisher 180 modifies the private bit and/or the copyright bit of the MPEG frame for the start and end of the content replacement break, without altering the encoded sounded or the expected behavior of the MPEG format for the live content stream 182.

In the case where the indicators are transmitted in the live content stream 182 itself, the publisher may mark the start and end of the content replacement break sections in the live content stream 182 with a preset audible sound indicator (e.g., a "jingle"), which can span up to several seconds. In one embodiment, different audible sounds can be used to represent the beginning and the end of the content replacement break.

In one embodiment, instead of inserting an audible sound as an indicator, the publisher 180 inserts a preset inaudible sound (also known as a beep) at a predetermined frequency (e.g., between 10 and 30 Hz (hertz)), with an amplitude in a specified band or over a specified threshold (as measured in decibels) for a duration exceeding a reference interval (e.g., between 50 ms and 500 ms). The frequency is at a range that may be beyond the normal human hearing ranges.

The publisher 180 embeds the inaudible sound in the live content stream 182 sent to the content replacement system 110 as an indicator of the beginning and the end of the content replacement break. In one embodiment, several such inaudible sounds are used, on different frequencies, to represent the start and the end of the content replacement break.

In one embodiment, more than two sounds (with different frequencies) may be used to represent events other than the start and end of a content replacement break, such as an indication that an upcoming content segment should be synchronized amongst listeners.

There may be a trade-off between how accurately the audio identifier marks the start and stop of the content replacement break, and the reference interval used. Therefore, a short reference interval (e.g., 50 ms) increases the time accuracy, but may also cause a higher chance of false positive detections. Conversely, a longer interval (e.g., 500 ms) may correspond to a less favorable time accuracy, but a lower chance of false positive detection. The publisher 180 may set the interval of the inaudible audio indicator such that the false positive detection rate is measured to be below a certain percentage.

In one embodiment, the publisher 180 uses a combination of the above described methods in order to indicate the start and end of content replacement breaks.

Example Content Replacement System

The content replacement system 110 may include an electronic device or collection of electronic devices that dynamically replaces content in content streams with replacement content received from the content replacement part management system 140. The content replacement system 110 may include a content replacement engine 112 and a listener delay store 116.

The listener delay store 116 stores listener delay values for listeners of content streams served by the content replacement system 110. A listener delay value corresponds to a time duration indicating the amount of delay in time of a listener's version of a content stream compared to a live content stream, such as the live content stream 182. Thus, if a listener's content stream (the listener content stream) is playing 10 seconds behind a corresponding live content stream (i.e., content which is generated by the live content stream is consumed by the listener 10 seconds later), then the listener delay value is 10 seconds.

As each listener may be presented with a customized version of a live content stream (i.e., a listener content stream), each listener may have a slightly different listener delay value for their own listener content stream compared to the listener delay values of other listeners of the same live content stream. In order to minimize the variations in the delays between listeners, the content replacement system 110, using the methods described herein, manages the listener delay values such that the listener delay values for each live content stream for all listeners approach or converge at a specified target delay value for the live content stream. This target delay value may be specified by the publisher of the live content stream, or may be specified by the content replacement system 110 (e.g., as a default value), and may also be stored in the listener delay store 116 for each live content stream served by the content replacement system 110. The target delay value may be zero in the case where it is desired to have as little delay as possible between the live content stream and the listener content stream (for all listeners). The target delay value may also be set to a higher value (e.g., 10 seconds) in other cases (e.g., when on-the-fly post-processing of the live content stream is needed).

The listener delay store 116 may store a listener delay value for each listener and each live content stream combination, indicating the delay between the listener's listener content stream and the corresponding live content stream 182. Each listener delay value may be stored even after the listener discontinues consumption of the live content stream. As the listener may subsequently reconnect with the live content stream within a short period of time, by continuing to store the listener delay value, the content replacement system 110 may be able to present a listener content stream to the listener with the same delay as when the listener had previously disconnected.

The content replacement engine 112 replaces content in live content streams to present customized listener content streams to listeners while targeting a target delay value for the listener content streams. The content replacement engine 112 receives one or more live content streams 182 from one or more publisher systems 180. These live content streams, as described above, may be audio streams, or may be other forms of content (e.g., video, interactive, text and graphics based), may be in one of many streaming formats, and may be associated with various metadata.

The live audio stream may include content replacement breaks, which are indicated by start and end indicators. The section of content of a live content stream 182 in between the start and end indicators is a section which the publisher of the live content stream 182 has deemed to be replaceable by replacement content, such as a sponsored content from a sponsored content provider. This provides an opportunity to customize the live content stream for every listener of the live content stream, and thus every listener receives a customized listener content stream based off the live content stream but including the replacement content parts.

The content replacement engine 112 may determine the start and end indicators for the live content stream 182 using different methods depending on the type of start and end indicators within the live content stream 182. In one embodiment, the content replacement engine 112 detects the start and end indicators, which may be audio signals as described above, using machine learning, Fourier Transforms, Fast Fourier Transforms, and/or Goertzel in the live content stream 182 as it is from the publisher. This allows the content replacement engine 112 to perform the corresponding logic for the start and respectively end events. In one embodiment, when the indicators are digital markers (flags) included in the metadata of the live content stream 182 as described above, the content replacement engine 112 detects the indicators by reading the digital data of the live content stream metadata (as opposed to using a spectrum analysis method). After detecting such digital markers (flags) the content replacement system 112 may change them to their inactive state before retransmitting the live content stream to the listener.

When receiving the live content stream 182, the content replacement engine 112 may detect a start indicator (e.g., using one of the methods described above), which indicates the start of a content replacement break. Upon detecting the start of the content replacement break, the content replacement engine 112 may request one or more regular content replacement parts from the content replacement part management system 140. To request these regular content replacement parts from the content replacement part management system 140, the content replacement engine 112 may submit information about the listener, such as listener demographics, content consumption history, and information about the current live content stream 182, such as its genre, name, etc. Alternatively, the content replacement engine 112 requests the regular content replacement parts prior to identifying the start indicator.

As described in further detail below, in response to the request by the content replacement engine 112 for regular content replacement parts, the content replacement engine 112 receives as a response from the content replacement part management system 140 with one or more regular content replacement parts. These regular content replacement parts are content items submitted by content providers (e.g., sponsored content providers) and other entities for insertion into the content replacement break to generate the listener content stream to present to a listener at a client device 170.

The content replacement engine 112 also requests one or more alternative content replacement parts from the content replacement part management system 140. Again, as described in further detail below, to request the alternative content replacement parts, the content replacement engine 112 may transmit information about the listener and the live content stream, as well as other information such as the listener delay and the target delay (which may be specified by the publisher, or other requirements), to the content replacement part management system 140. The content replacement engine 112 receives as a response from the content replacement part management system 140 one or more alternative content replacement parts as a result. These alternative content replacement parts have a diverse set of durations that may be grouped according to the durations, and are ordered according to various criteria, such as the listener delay increase caused by adding the corresponding alternative content replacement part.

The content replacement engine 112 initially inserts the regular content replacement parts in the content replacement break for the listener content stream. These may be inserted in order according to the order in which the regular content replacement parts were received from the content replacement part management system 140. The content replacement engine 112 inserts into the listener content stream each regular content replacement part after the end of the previous regular content replacement part. Thus, the regular content replacement parts are inserted consecutively from the start indicator of the content replacement break. The content replacement engine 112 may insert the replacement parts into the existing content stream by merging the replacement part into the listener content stream. For example, the content replacement engine 112 may insert the waveform of the replacement part into the waveform of the listener content stream at the correct location and re-encoding the merged waveform as the listener content stream. As the content stream is live, these regular content replacement parts are streamed by the content replacement system 110 to the listener as they are inserted.

The content replacement engine 112 inserts the regular content replacement parts until it detects the end indicator of the content replacement break in the live content stream 182. The content replacement engine 112 may determine that the end of the finally inserted regular content replacement part coincides exactly with the end of the content replacement break. In such a case, the content replacement engine 112 completes the insertion of the content replacement parts, and the un-modified content subsequent to the content replacement break is streamed to the listener by the content replacement system 110 as part of the listener's content stream. However, this is unlikely to happen, as it is rare that a selection of content replacement parts have a duration exactly equaling the duration of the content replacement break. Furthermore, as the exact duration of the content replacement break in the live content stream 182 may not be known a priori due to the live nature of the content stream, the content replacement engine 112 may not be able to determine a priori a combination of regular content replacement parts that would have a total duration equal to the duration of the content replacement break.

In this scenario, the content replacement engine 112 may not be able to insert additional regular content replacement parts into the content replacement break as any additional regular replacement part inserted into the content replacement break would exceed the duration of the content replacement break (i.e., the end of the content replacement break would precede the end of the regular replacement part that would be inserted). Instead, the content replacement engine 112 inserts (at least) one of the alternative content replacement parts of a selected duration that most closely approximates the remaining duration between the end of the finally inserted regular content replacement part and the end of the content replacement break. Insertion of this alternative content replacement part creates a listener content stream with a listener delay value that is as close to zero as possible (i.e., the live content stream and the listener content stream varies as little as possible). Note that the content replacement engine 112 may not insert an alternative content replacement part that results in a total duration of the content replacement parts that is less than the duration of the content replacement break.

In one example embodiment, however, the content replacement engine 112 may attempt to match the listener delay value with a target delay value for the live content stream 182. This target delay value may be positive or negative, and indicates a time delta that should be achieved between the listener content stream and the live content stream. In one case, to have the listener delay value approach the target delay value, the content replacement engine 112 may extend the end of the content replacement break by the target delay value, and insert the regular content replacement parts and the alternative content replacement part into this extended content replacement break in the method described above. If the target delay value is negative, the content replacement engine 112 may reduce the duration of the content replacement break by the target delay value, and perform the insertion of the content replacement parts as described above.

For each listener content stream, after the content replacement engine 112 completes the insertion of the regular content replacement parts and the alternative content replacement part into the content replacement break (which may be modified), the content replacement engine 112 updates the listener delay value in the listener delay store 116 for the listener for the particular live content stream.

When the content replacement engine 112 detects the next content replacement break in the live content stream, the content replacement engine 112 retrieves (from the listener delay store 116 or from cache) the listener delay value for the listener for the corresponding live content stream 182. At this point, although a content replacement break may be occurring in the live content stream, the listener content stream is delayed by the listener delay value, and thus the content replacement break may not have occurred yet with the listener content stream. Once the listener content stream also reaches the start of the content replacement break (i.e., "catches up" to the same point after the listener delay value), the content replacement engine 112 may begin to insert the regular content replacement parts in to the content replacement break for the listener content stream. However, the content replacement engine 112 may again modify the duration of the content replacement break in the listener content stream such that the result is that the listener delay value is to approach the target delay value.

To do this, the content replacement engine 112 may modify the duration of the content replacement break for the listener such that the expected listener delay value caused by using the content replacement break with the modified duration (to shift the listener content stream) approaches or equals the target delay value. For example, if the current listener delay value is 5 seconds and the target delay value is 10 seconds, the content replacement engine 112 may increase the content replacement break duration by 5 seconds such that the resulting listener delay value may approach the target delay value. As another example, if the current listener delay value is 10 seconds, and the target delay value is zero seconds, then the content replacement engine 112 may reduce the duration of the content replacement break by 10 seconds. In both examples, the result is that the listener delay value is expected to shift towards the target delay value.

Once the content replacement engine 112 modifies the duration of the content replacement break, the content replacement engine 112 requests and inserts the regular content replacement parts in the content replacement break with modified duration, and requests and inserts one alternate content replacement break, in the same method as described above. After inserting the content replacement parts, the total duration of the inserted content replacement parts may not equal the duration of the content replacement break. In this case, the content replacement engine 112 updates the listener delay value for the listener content stream with a new listener delay value corresponding to the time difference between the live content stream 182 and the listener content stream after the insertion of the content replacement parts. For example, if a content replacement break was 30 seconds, and the total duration of the regular content replacement parts and the selected alternative content replacement part was 35 seconds, then the listener delay value would be increased by 5 seconds.

The content replacement engine 112 may repeat the insertion of the content replacement parts as described above for as long as the listener consumes the live content stream.

Note that when a client device of the listener first requests the live content stream 182, the content replacement engine 112 may initialize the listener delay value for the client device to be equal to zero. Under this scheme, for the first content replacement break that the content replacement engine 112 detects for the listener's content stream, the content replacement engine 112 modifies the duration of the content replacement break such that the expected listener delay value after modification equals the target delay value.

Note also that in some cases, the content replacement engine 112, when inserting the regular content replacement parts until it detects the end of the content replacement break, may determine that the total duration of the regular content replacement parts already exceeds the duration of the content replacement break. In this case, the content replacement engine 112 may not insert any alternative content replacement parts into the content replacement break. Note that after inserting each content replacement part, that content replacement part is transmitted in the listener content stream to the listener in real-time or substantially in real-time. Thus, the content replacement engine 112 cannot "recall" a content replacement part to be replaced by one of different duration.

In the above description, the content replacement engine 112 detects the end of the content replacement break and may stop inserting the regular content replacement parts before the end of the content replacement break, although the live content stream 182 is being presented in real time. The content replacement engine 112 may be able to do this by buffering the live content stream for the listener, or through the use of a positive target delay value. By buffering or delaying the live content stream 182 compared to the live content stream, the content replacement engine 112 is able to determine the end of the content replacement break before having to insert the content replacement parts. The content replacement engine 112 may then react appropriately and insert the correct content replacement parts as described above. The content replacement engine 112 may also or alternatively receive an indication from the publisher of where the end of the content replacement break will occur, prior to the end of the content replacement break occurring. For example, the indication of the end may be received as a digital flag by the content replacement engine 112 when the content replacement engine 112 detects the start of the content replacement break.

Although the above description is made with reference to listeners, audio streams, and live content, it is not limited to such and may be applied to other content, such as video and interactive content, and to non-live content.

In one embodiment, The method according to the invention may be part of a larger media servicing network that can be used to, among other things, deliver streaming (real-time) and/or static (on-demand) content, deliver targeted advertising, collect metric information regarding content and advertising consumption.

Additional details regarding the method described above are described in further detail with regards to FIGS. 2-6.

Example Content Replacement Part Management System

The content replacement part management system 140 may be configured to respond to requests for regular content replacement parts and alternative content replacement parts with regular and alternative content replacement parts, respectively. The content replacement part management system 140 may include a replacement content store 142 and an alternative content store 144.

The regular content replacement store 142 stores regular content replacement parts. These regular content replacement parts include content items, such as sponsored audio items from sponsored content providers, which may be inserted into a content stream. The regular content replacement store 142 may store with each regular content replacement part various metadata regarding that regular content replacement part. The metadata may include information regarding the targeting criteria for the regular content replacement part. These targeting criteria specify which listeners should be presented with the regular content replacement part, and may be specified by the content provider that provided the regular content replacement part to the content replacement part management system 140. The targeting criteria for each regular content replacement part may include specific geographic criteria (e.g., location, language), demographic criteria (e.g., age range, gender), content streams in which the regular content replacement part should be inserted (e.g., content streams with certain genre characteristics), device criteria (e.g., mobile device only), and/or listener profile criteria (e.g., listeners with certain listening characteristics stored in a profile for the listener).

The content replacement part management system 140 may receive a request from the content replacement system 110 for one or more regular content replacement parts, along with information regarding a content stream being presented to a client device of a listener, and various characteristics regarding the user profile of the listener and characteristics regarding the client device. In response, the content replacement part management system 140 may transmit as a reply the one or more regular content replacement parts with targeting criteria matching the characteristics of the content stream, listener, and/or client device.

In one embodiment, each regular content replacement part may also include information about a bid value indicating an amount for which the content provider of the regular content replacement part may wish to submit as compensation for the opportunity to present the regular content replacement part to a listener. This bid value may indicate a monetary compensation amount (e.g., a dollar amount) provided for presenting the content replacement part, or may indicate an average value for which the content provider is willing to submit as compensation. The compensation may be provided to the content replacement system 110, to the publisher system 180, or to a combination of both. In response to the request for content from the content replacement system 110, the content replacement part management system 140 may conduct a real time bid with the regular content replacement parts matching targeting criteria based on the bid values, and transmit as a reply a list of regular content replacement parts ordered according to the bid value. If a regular content replacement part in the list is subsequently presented to a listener, then the content replacement system 110 receives a compensation amount corresponding to the bid value specified in the targeting criteria for that regular content replacement part.

In one example embodiment, the content replacement part management system 140 retrieves the regular content replacement parts directly from the content providers of the regular content replacement parts (e.g., sponsored content providers or other third parties). The content replacement part management system 140 may transmit the characteristics of the listener, content stream, client device, and/or other information (which may be stripped of personally identifiable information) to the content providers, which may respond with a bid value and a regular content replacement part. The content replacement part management system 140 may select from the responses a list of regular content replacement parts with the highest bid values.

In one embodiment, the content replacement part management system 140, when receiving a request for regular content replacement parts, also receives an indication of an estimate of the duration of the content replacement breaks into which the content replacement parts are to be inserted. In such a case, the content replacement part management system 140 responds with regular content replacement parts that are no longer in duration than the duration of the content replacement break. This duration may be an estimated duration or a maximum duration for content replacement breaks for the content stream being presented to a listener.

In some cases, the content replacement part management system 140 may constrain the regular content replacement parts that are selected based on various constraints. For example, one constraint may indicate that two regular content replacement parts may be from two competing content sources (e.g., two competitors making the same product). Additionally, the regular content replacement parts may all have similar durations within a threshold range (e.g., all 25-35 seconds).

The alternative content replacement store 144 stores alternative content replacement parts. As described above, the alternative content replacement parts may be used to bridge a gap within a content replacement break between the last regular content replacement part and the end of the content replacement break. In such cases, the duration of time between the end of the last regular content replacement part and the end of the content replacement break may be too short or too long to fit a whole number of regular content replacement parts.

The alternative content replacement parts are similar in some aspects to the regular content replacement parts, and may include audio content, and may be associated with metadata, such as targeting criteria, and so on. However, the composition of the alternative content replacement parts and the method in which they are selected may differ from the method described above for responding with a selection of regular content replacement parts.

In particular, the composition of the alternative content replacement parts in the alternative content replacement store 144 may differ from the composition of the regular content replacement parts in the regular content replacement store 142. The alternative content replacement parts in the alternative content replacement store 144 have varied durations, with a high statistical spread (i.e., variance, dispersion, standard deviation). In other words, the alternative content replacement parts have a diverse range of durations. These durations may be distributed in a normal distribution according to the most common requested durations made to the content replacement part management system 140. The provisioning of a collection of varied durations increases the probability for the last content replacement part to bring the user time as close to the desired latency-behind-real time, even if the exact length of the content break is not known beforehand. Additionally, although the alternative content replacement parts may be associated with bid values that are lower than the regular content replacement parts (possibly due to irregular durations), they have the benefit of being able bridge the gap as described for the content replacement break.

Upon receiving a request for a set of alternative content replacement parts, the content replacement part management system 140 may respond with one or more alternative content replacement parts that are group together in sets based on the duration of each alternative content replacement part. The ranges of the durations of each set may be based off a specified duration in the request (e.g., the ranges of durations selected may be near the duration specified in the request). The ranges of durations of each set may be consecutive, such that each set includes alternative content replacement parts with durations between the maximum duration of the previous set and maximum duration of the previous set plus an increment value. The increment value may be constant (causing the ranges of durations of each set to be the same), or may increase geometrically (such that the ranges of durations of each set also increase). For example, the increment value may be 5 seconds. This allows the response from the content replacement part management system 140 to have a sufficient spread of alternative content replacement parts.

In one embodiment, the content replacement part management system 140, instead of retrieving the alternative content replacement parts from a local store, such as the alternative content replacement store 144, retrieves or requests for the alternative content replacement parts from a third party system. When performing the request, the content replacement part management system 140 may directly request from the third party system alternative content replacement parts with a high spread (e.g., high dispersion, spread, standard deviation). However, if the third party system does not support such operations, and can only return content items of fixed duration, the content replacement part management system 140 may instead submit several requests to the third party system, each request specifying a desired minimum and maximum duration, depending on the sets of alternative content replacement parts that are to be generated.

If more than one alternative content replacement part is selected per set, these alternative content replacement parts may be sorted according to various criteria as described below. These criteria may also be used to select alternative content replacement parts out of many candidate alternative content replacement part for each set (as described above). If each set is limited to a requested number of alternative content replacement parts within a range of durations, then the content replacement part management system 140 may sort the alternative content replacement parts according to the criteria as described below, and a number the top sorted alternative content replacement parts equal to the requested number is selected to be transmitted to the content replacement system 110. In another embodiment, the alternative content replacement parts are not grouped into sets, and are directly sorted by the criteria indicated below.

The criteria may include sorting the content replacement parts in ascending order by |TargetLatency-ActualLatency|/CommercialValue, which is the absolute value of the difference $\Delta t$ between the target delay value and the listener delay value divided by the commercial value of inserting the alternative content replacement part (cost per mile). This approach targets minimization of the difference between desired target delay and the listener delay of the user behind real time.

The criteria may include sorting the alternative content replacement parts in ascending order by Commercial Value. This approach would target maximization of the commercial value (i.e. revenue obtained) of each content replacement part, while not also keeping the difference between the listener delay value and the target delay value bounded to the step of the alternative replacement parts.

The criteria may include sorting the alternative content replacement parts ascending by |TargetLatency-ActualLatency|, which is the absolute value of the difference between target delay value and the listener delay value produced by each specific alternative content replacement part. This approach targets a trade-off between maximizing the commercial value of the insertion and minimizing the absolute value of the difference between desired and actual delay of the user behind real time.

The commercial value (or cost per mile) may be set by the sponsored content provider that provides the content replacement part, and may, in one embodiment, be the bid value of the content replacement part as described above.

Additional details regarding a sample set of alternative content replacement parts is described below in further detail with regards to FIG. 5.

Using the system described above, multiple advantages may be realized. As previously noted, in some cases with streaming over the Internet or other digital medium, providing customized streams to listeners may increase the listenership for the stream. However, this poses a problem where each individual listener content stream (that is based off the live content stream) is not synchronized with the other listener content streams. This may be a violation of local laws, or may cause some listeners to hear specific content prior to other users (e.g., the announcement of a goal in a soccer match). This may generate negative feedback from listeners, resulting in lower listenership. Furthermore, as the content is a live stream, the content replacement parts used to customize the stream may not be determined a priori in order to ensure synchronization. However, by inserting regular and alternative content replacement parts dynamically using the method described above, any differences in delay between listeners is diminished, resulting in an improved listening experience and a likely increase in listenership.

Example Flow for Dynamic Content Insertion

Figure 2:
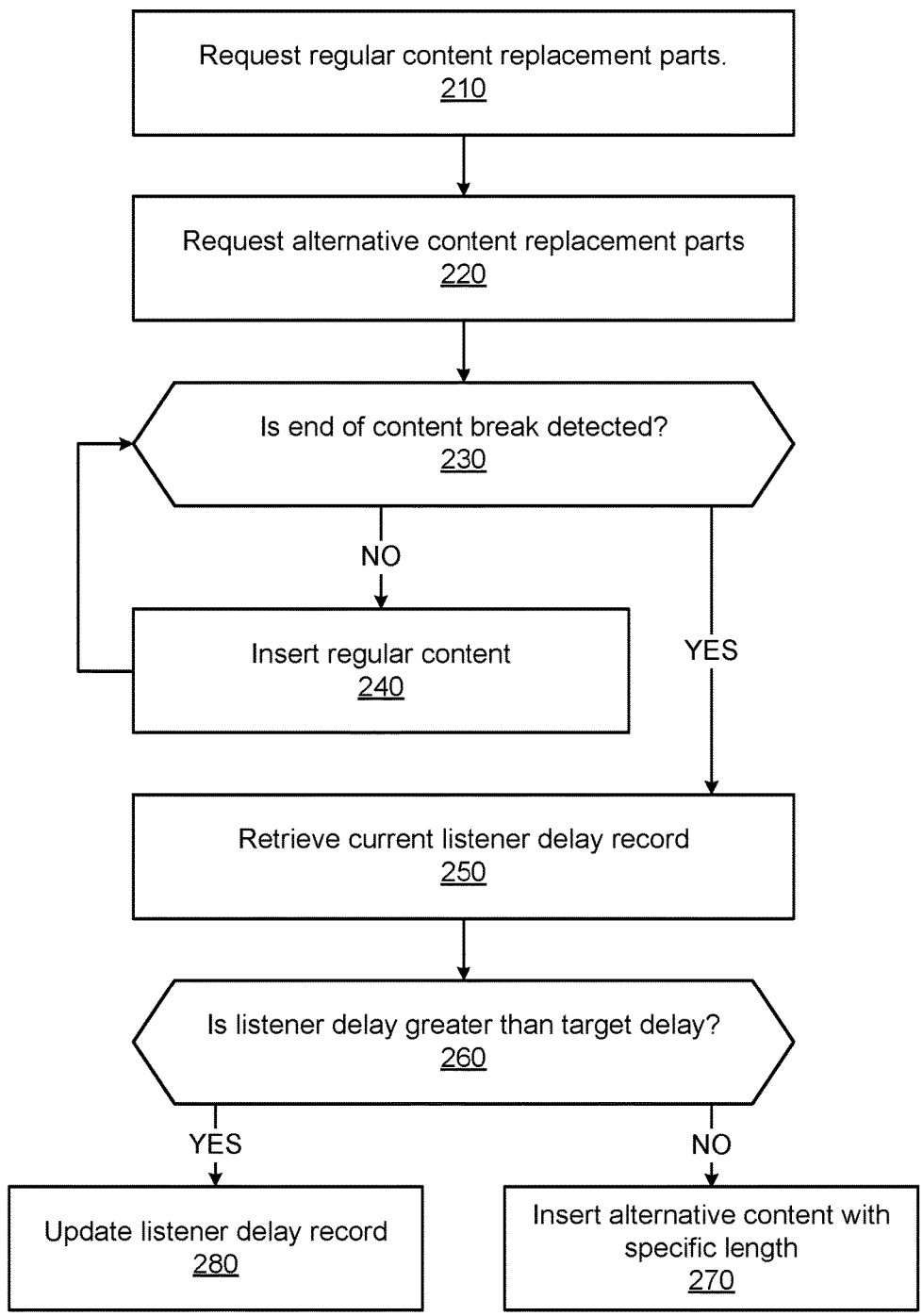
FIG. 2 is a flow chart illustrating an exemplary method 200 for dynamic content insertion, according to one embodiment.

FIG. 2 is a flow chart illustrating an exemplary method 200 for dynamic content insertion, according to one embodiment. In one embodiment, FIG. 2 attributes the steps of the method 200 to the content replacement system 110. However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 724, that may be executed by the processor 702 described with respect to FIG. 7.

After encountering a content replacement break, the content replacement system 110 may request 210 (e.g., from the content replacement part management system 140) the regular content replacement parts. As described above, these may be content items, such as sponsored content items, that are selected specifically for the particular listener of the live content stream. The content replacement system 110 also requests 220 alternative content replacement parts. These alternative replacement parts are content replacement parts that are also selected based on characteristics of the listener, client device used by the listener, location of the listener, and so on, like the regular content replacement parts. However, in addition, the content replacement system 110 may receive the alternative content replacement parts with a diverse set of durations. One or more of these alternative content replacement parts may be used by the content replacement system 110 to bridge a gap between the end of the finally inserted regular content replacement part and the end of the content replacement break.

If the content replacement system 110 does not detect 230 the end of the content replacement break, the content replacement system 110 inserts 240 the regular content replacement parts. Once the content replacement system 110 detects 230 the end of the content replacement break, the content replacement system 110 retrieves 250 the current listener delay value (i.e., the current delay for the listener content stream compared to the live content stream) for the combination of the listener and the live content stream that the listener is currently listening to. The content replacement system 110 determines 260 whether the listener delay value is greater than the target delay value for the live content stream. If it is, the content replacement system 110 updates 280 the stored listener delay record with the new and current listener delay value. Otherwise, the content replacement system 110 inserts 270 an alternative content replacement part with a specific duration into the listener content stream so that the current listener delay value approaches the target delay value. The content replacement system 110 may repeat this process for each content replacement break.

Example Diagram Illustrating Scenario for Content Replacement

Figure 3:
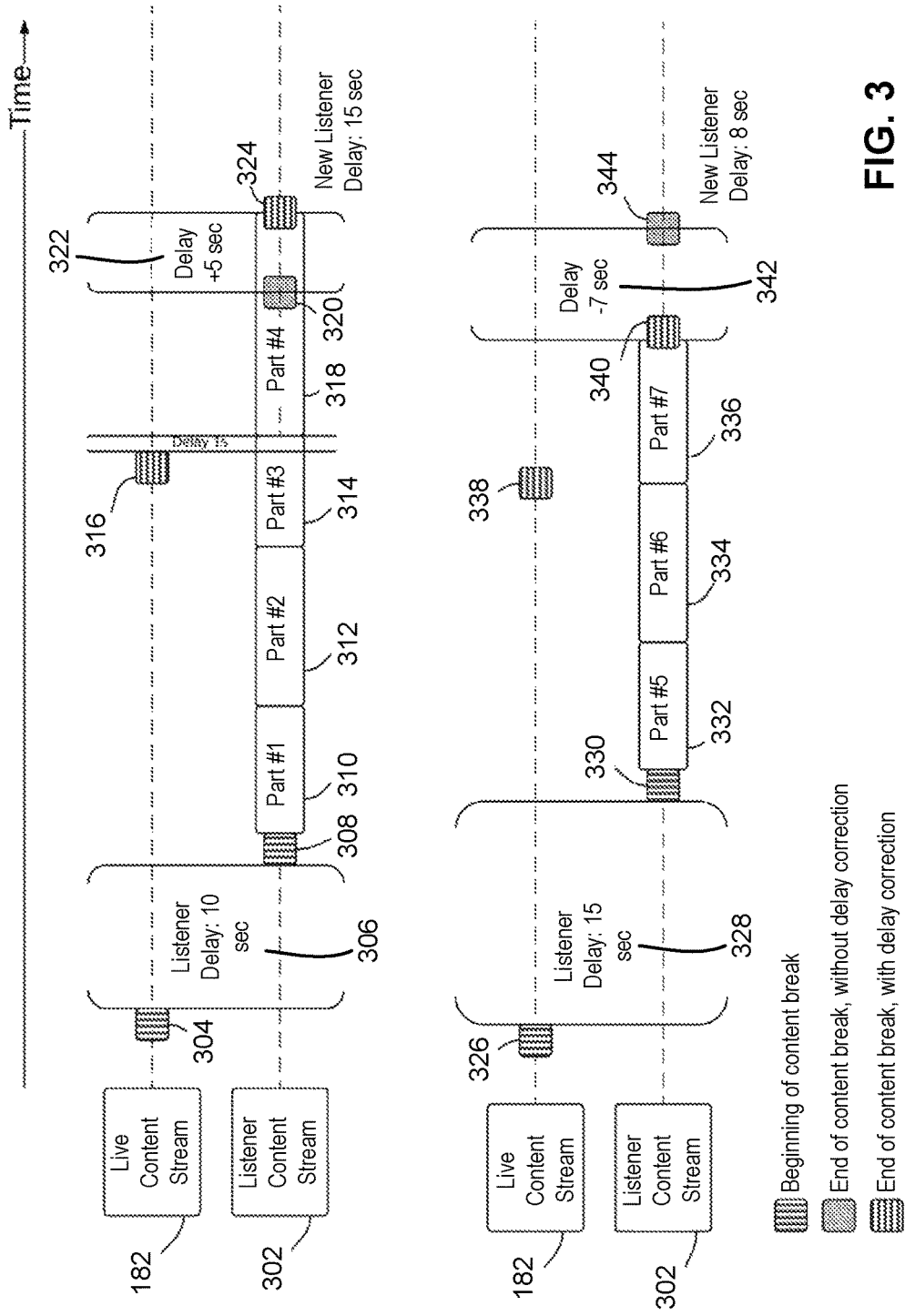
FIG. 3 illustrates an exemplary scenario for dynamic content insertion, according to one embodiment.

FIG. 3 illustrates an exemplary scenario for dynamic content insertion, according to one embodiment. The scenario described in FIG. 3 is for the purposes of clarifying and exemplifying the above description with regards to FIG. 1, but is not intended to limit the description only to the scenario as depicted.

FIG. 3 illustrates two horizontal dotted lines indicating the live content stream 182 and the listener content stream 302. As noted previously, the live content stream 182 is generated by the publisher system 180, is received by the content replacement system 110, and is customized as the listener content stream 302 and transmitted to the client device 170 of a listener for consumption.

Referring to the illustration of the live content stream 182 and the listener content stream 302 on the top half of FIG. 3, the content replacement system 110 detects a content replacement break in the live content stream 182, indicated by block 304. However, at this point, the listener delay value as indicated at 306 is 10 seconds. Thus, the start of the content replacement break for the listener content stream 302 occurs 10 seconds later at block 308. At this point, the content replacement system 110 inserts the regular content replacement parts (that were requested) into the content replacement break for the listener content stream 302, and these regular content replacement parts are indicated by 310, 312, and 314 in FIG. 3.

Block 316 in FIG. 3 illustrates the end of the content replacement break for the live content stream 182. The content replacement system 110 notes this and also determines that the target delay should be 15 seconds. In order to achieve this, the content replacement system 110 modifies the duration of the content replacement break for the listener content stream 302 such that the resulting listener delay value is 15 seconds, and the content replacement system 110s elects an alternative content replacement part out of the requested alternative content replacement parts that causes the resulting listener delay value to be 15 seconds, which is in line with the target delay value for the live content stream 182. The alternative content replacement part is indicated at 318. Furthermore, if the content replacement system 110 did not insert an alternative content replacement part as indicated at 318, the listener delay value would instead be reduced to 9 seconds, which would be further from the target delay value of 15 seconds. As shown in FIG. 3, the block 320 indicates the end of the content replacement break with the original 10 second delay, and the block 324 indicates the end of the content replacement break after modification of the content replacement break to cause the listener delay value to approach the target delay value.

Subsequently, as illustrated in the bottom half of FIG. 3, the content replacement system 110 detects a second content replacement break at block 326 in the live content stream 182. The content replacement system 110 determines as indicated at 328 that the current listener delay value is 15 seconds. This is in line with the target delay value of 15 seconds for this live content stream 182. The content replacement break for the listener content stream 302 thus starts 15 seconds later, as indicated by block 330. The content replacement system 110 inserts the regular content replacement parts as indicated at 332, 334, and 336.

Meanwhile, the content replacement system 110 detects the end of the content replacement break for the live content stream 182 as indicated at 338. At this point, the content replacement system 110 determines that no additional content replacement parts should be inserted, as this would increase the listener delay value beyond the target delay value of 15 seconds. This may be because any of the available and remaining content replacement parts, if inserted, would cause the listener delay value to exceed the target delay value. Instead, the content replacement system 110 indicates at 340 the end of the content replacement break for the listener content stream 302. The content replacement system 110 also updates the listener delay value to be 8 seconds. Note that without this adjustment, the content replacement break would have ended at 344 for the listener content stream 302.

Although two content replacement breaks and the process for inserting content replacement parts into these breaks are shown here, the content replacement system 110 would in most cases continue to insert content replacement parts according to the method shown as the content replacement system 110 detects new content replacement breaks subsequent to those shown in the scenario here in FIG. 3.

Example Transactional Diagram

Figure 4:
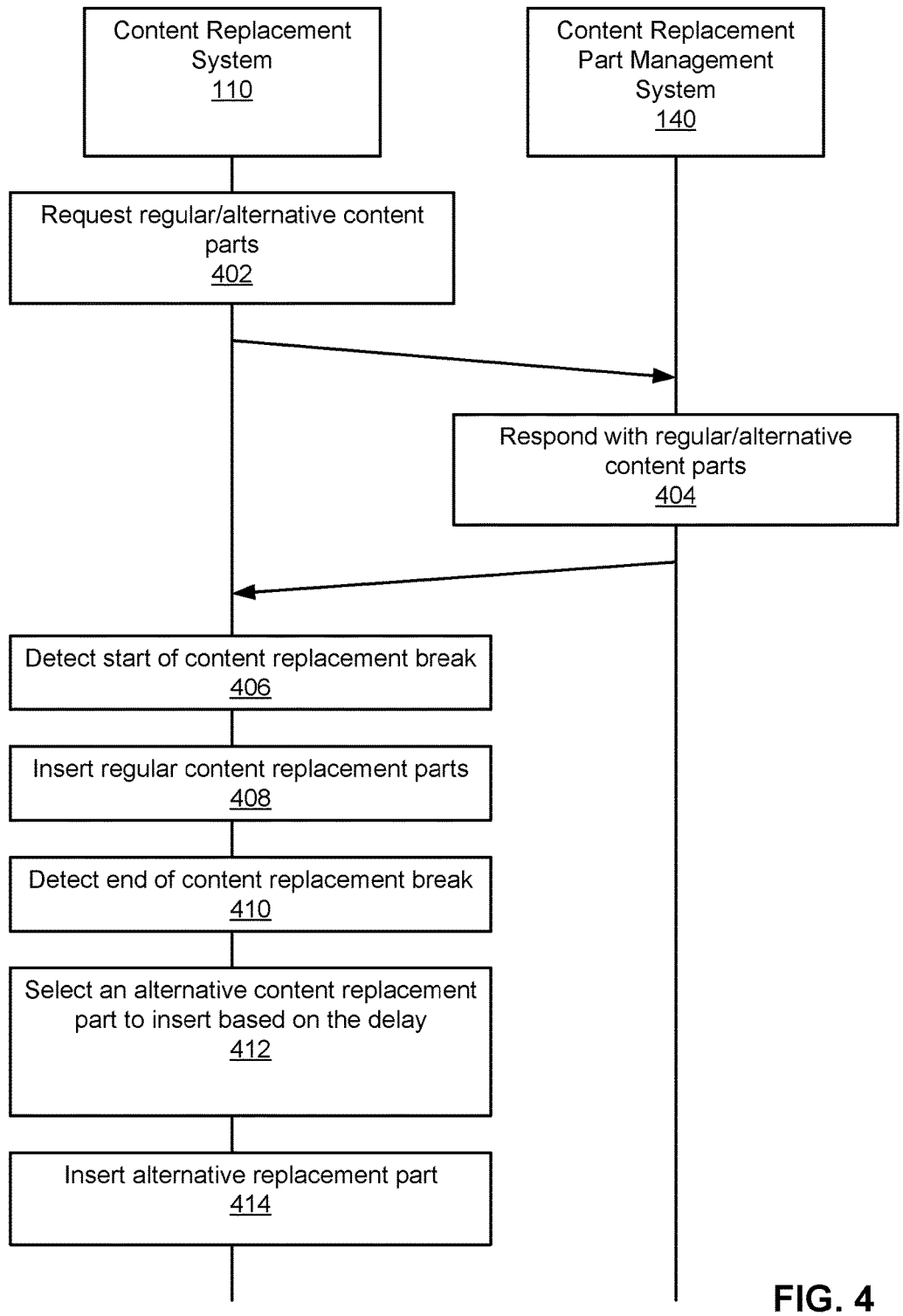
FIG. 4 is a transactional diagram illustrating the process between the content replacement system 110 and the content replacement part management system 140, according to one embodiment.

FIG. 4 is a transactional diagram illustrating the process between the content replacement system 110 and the content replacement part management system 140, according to one embodiment. In some embodiments the steps may be performed in parallel, in different orders, or with different steps may be performed. Also, it is noted that in one example embodiment the steps and/or modules may be embodied as instructions, e.g., instructions 724, that may be executed by the processor 702 described with respect to FIG. 7.

Initially, the content replacement system 110 may request 402 a set of regular and alternative content replacement parts for the listener. In response, the content replacement part management system 140 may respond 404 with a set of regular and alternative content replacement parts. These content replacement parts may be selected based on characteristics of the listener, the listener's client device, the location of the listener, the characteristics of the live content stream being presented to the listener, and so on, as described above.

The content replacement system 110 detects 406 the start of the content replacement break in the live content stream. At this point, the content replacement system 110 inserts 408 the regular content replacement parts in the listener's version of the live content stream (the listener content stream), until the content replacement system 110 detects 410 the end of the content replacement break. The content replacement system 110 may also modify the duration of the content replacement break such that the resulting listener delay value approaches the target delay value of the live content stream.

At this point, the content replacement system 110 selects 412 an alternative content replacement part to insert based on the listener delay value and the target delay value, as described above. The content replacement system 110 selects an alternative content replacement part that causes the listener delay value to approach the target delay value. After selecting the alternative content replacement part, the content replacement system 110 inserts 414 the alternative content replacement part after the last inserted regular content replacement part in the content replacement break of the listener content stream. This process may be performed dynamically and in real-time as the content replacement system 110 receives the live content stream. Thus, as the content replacement system 110 inserts the content replacement parts, the inserted content replacement parts are subsequently presented to the listener with little or no delay.

Example Sets of Alternative Content Replacement Parts

Figure 5:
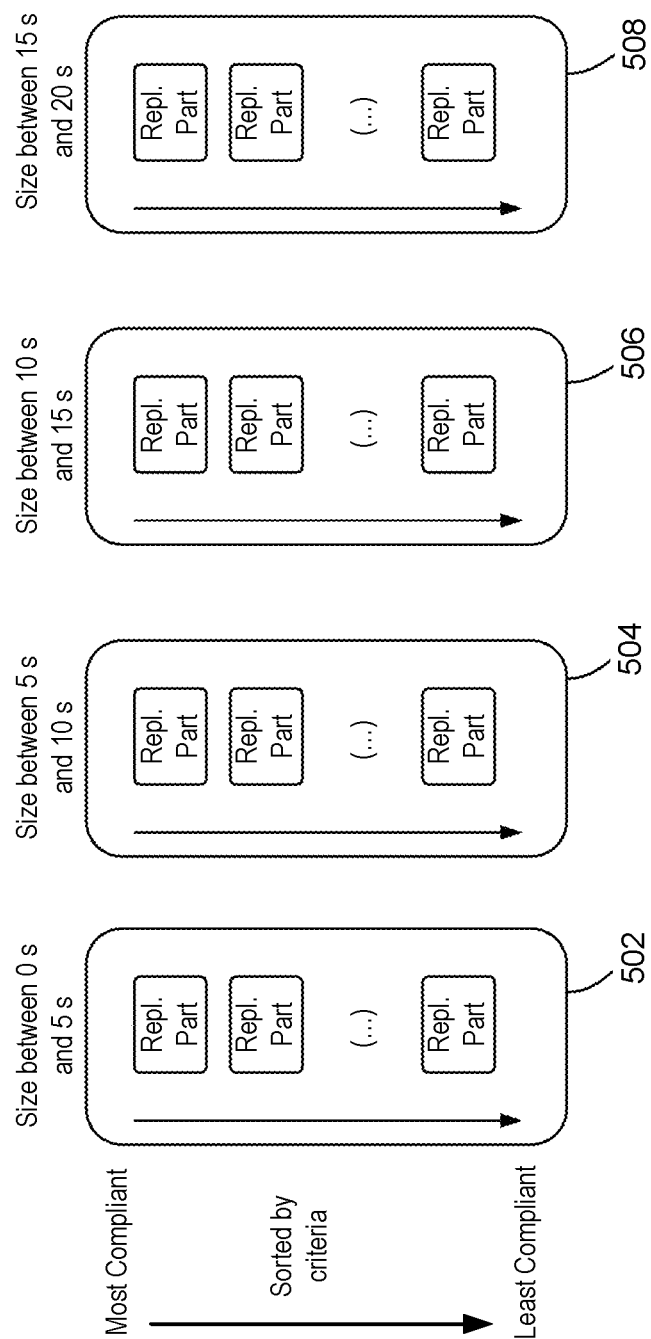
FIG. 5 is illustrates exemplary sets of alternative content replacement parts that may be returned by the content replacement part management system 140, according to one embodiment.

FIG. 5 is illustrates exemplary sets of alternative content replacement parts that may be returned by the content replacement part management system 140, according to one embodiment. As noted above, the content replacement system 110 may request from the content replacement part management system 140 sets of alternative content replacement parts, with each set having alternative content replacement parts within a certain range of durations. FIG. 5 illustrates an example of these sets, where each set has a range of alternative content replacement parts of five seconds. Furthermore, each set may optionally include more than one alternative content replacement part. If this is the case, the alternative content replacement parts may be ordered according to the various criteria as described above. In FIG. 5, the ordering based on the criteria is illustrated as ranging from the most compliant replacement parts to the least compliant. Note that although a certain number of replacement parts and a certain duration are shown here as an example, in other embodiments different combinations, numbers, criteria, time durations, and other factors may be used.

As shown in FIG. 5, the sets of the alternative content replacement parts include:

(i) the set 502 of alternative content replacement parts with durations from zero seconds exclusively to five seconds, inclusively;

(ii) the 504 set of alternative content replacement parts with durations from five seconds exclusively to ten seconds, inclusively;

(iii) the set 506 of alternative content replacement parts with durations from ten seconds exclusively to fifteen seconds, inclusively; and (iv) the set 508 of alternative replacement parts with durations from fifteen seconds exclusively to twenty seconds, inclusively.

After receiving these sets of alternative content replacement parts, the content replacement system 110 may select the most compliant alternative content replacement part from the set with the indicated durations that when inserted into the content replacement break allows for the resulting listener delay value to most closely approach the target delay value.

Although four sets are illustrated here, the content replacement part management system 140 may generate further sets of alternative replacement parts until the desired spread is obtained.

The content replacement part management system 140 may compute the specific ranges for each set and number of sets to generate based on the target delay value and the listener delay value provided by the content management system 110. The interval for each range, as well as the overall durations in each set, may depend upon the difference between the listener delay value and the target delay value and the estimated length of the content replacement break. This estimated length may be based upon a maximum content replacement break duration for the publisher of the live content stream, or based on historical analysis of the durations of content replacement breaks for the live content stream (and which may be constrained by the time of day, day of the week, and so on). For example, if the content replacement break for a publisher is 30 seconds on average, the content replacement part management system 140 may select alternative content replacement parts less than 30 seconds, and may have the interval of each range in each set be proportional to the difference between the listener delay value and the target delay value.

In the example of FIG. 5, assuming replacement parts are sufficiently available as for each set to be non-void, then the difference between the target delay value and the listener delay value will not exceed in absolute value equal to the interval of each range of the alternative content replacement parts sets. Thus, in the presented example, the interval will not be greater than 5 seconds.

Example Flow for Inserting Content Replacement Parts Meeting a Desired Duration

Figure 6:
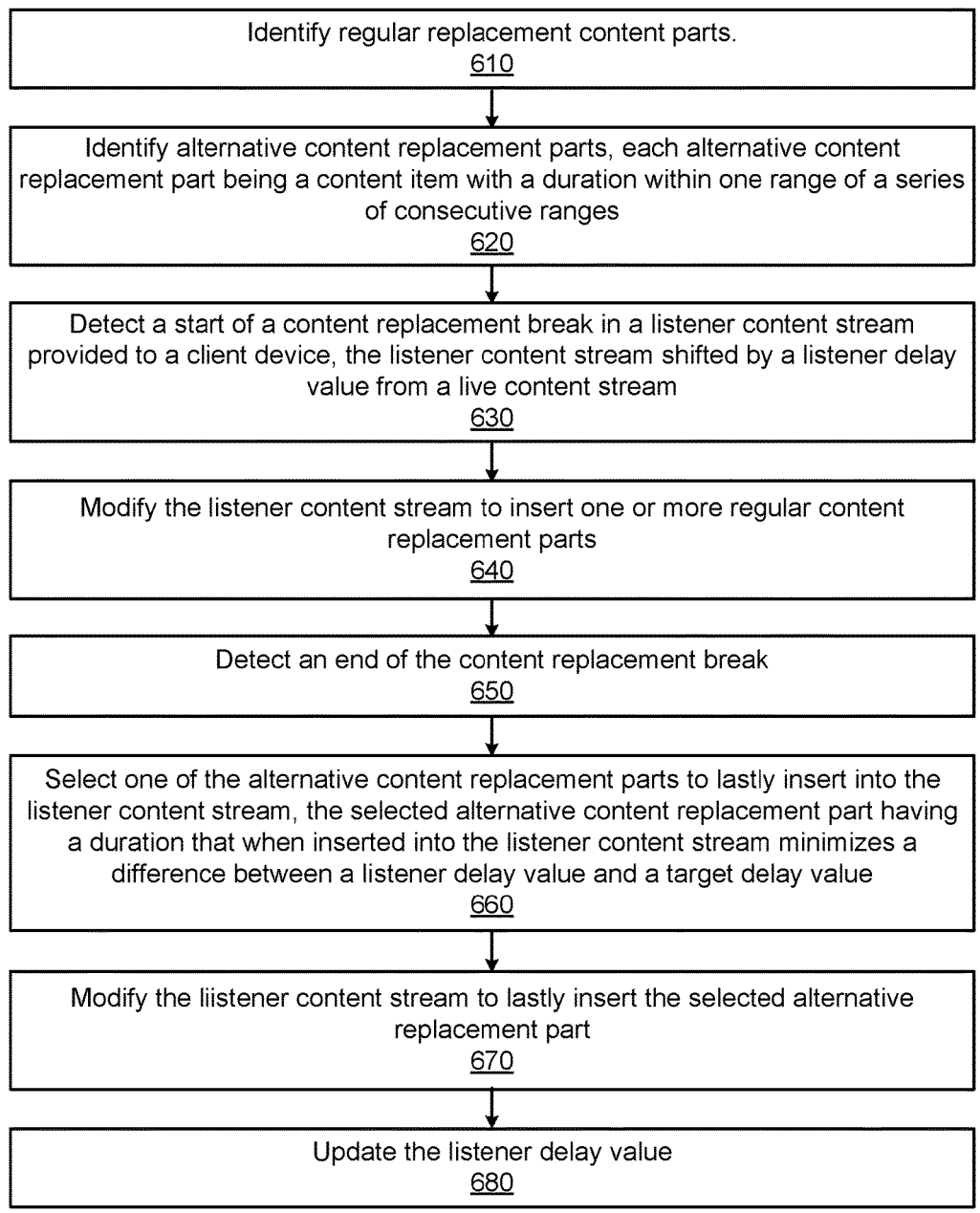
FIG. 6 is a flow chart illustrating an exemplary method 600 for inserting content replacement parts meeting a desired duration, according to one embodiment.

FIG. 6 is a flow chart illustrating an exemplary method 600 for inserting content replacement parts meeting a desired duration, according to one embodiment. In one embodiment, FIG. 6 attributes the steps of the method 600 to the content replacement system 110. However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 724, that may be executed by the processor 702 described with respect to FIG. 7.

The content replacement system 110 identifies 610 one or more regular replacement content parts. The content replacement system 110 may also identify 620 one or more alternative content replacement parts, each alternative content replacement part having a duration within one range of a series of consecutive ranges. The content replacement system 110 detects 630 a start of a content replacement break in a listener content stream provided to a client device. The listener content stream is based on a live content stream and is shifted by a listener delay value from the live content stream.

The content replacement system 110 modifies 640 the listener content stream to insert one or more of the regular content replacement parts in the content replacement break of the listener content stream. The content replacement system 110 detects 650 the end of the content replacement break. At this point, the content replacement system 110 selects 660 one of the alternative content replacement parts to lastly insert into the listener content stream. The alternative content replacement part that is selected has a duration that when inserted into the listener content stream to minimize a difference between the listener delay value and a target delay value. The content replacement system 110 modifies 670 the listener content stream to lastly insert the selected alternative content replacement part. As described above, this allows the content replacement system 110 to generate a customized listener content stream for a listener that adheres to a target delay value.

Subsequently, the content replacement system 110 updates 680 the listener delay value based on the delay of the listener content stream as compared to the live content stream. This delay may have been affected by the insertion of the content replacement parts.

Example Machine Architecture

Figure 7:
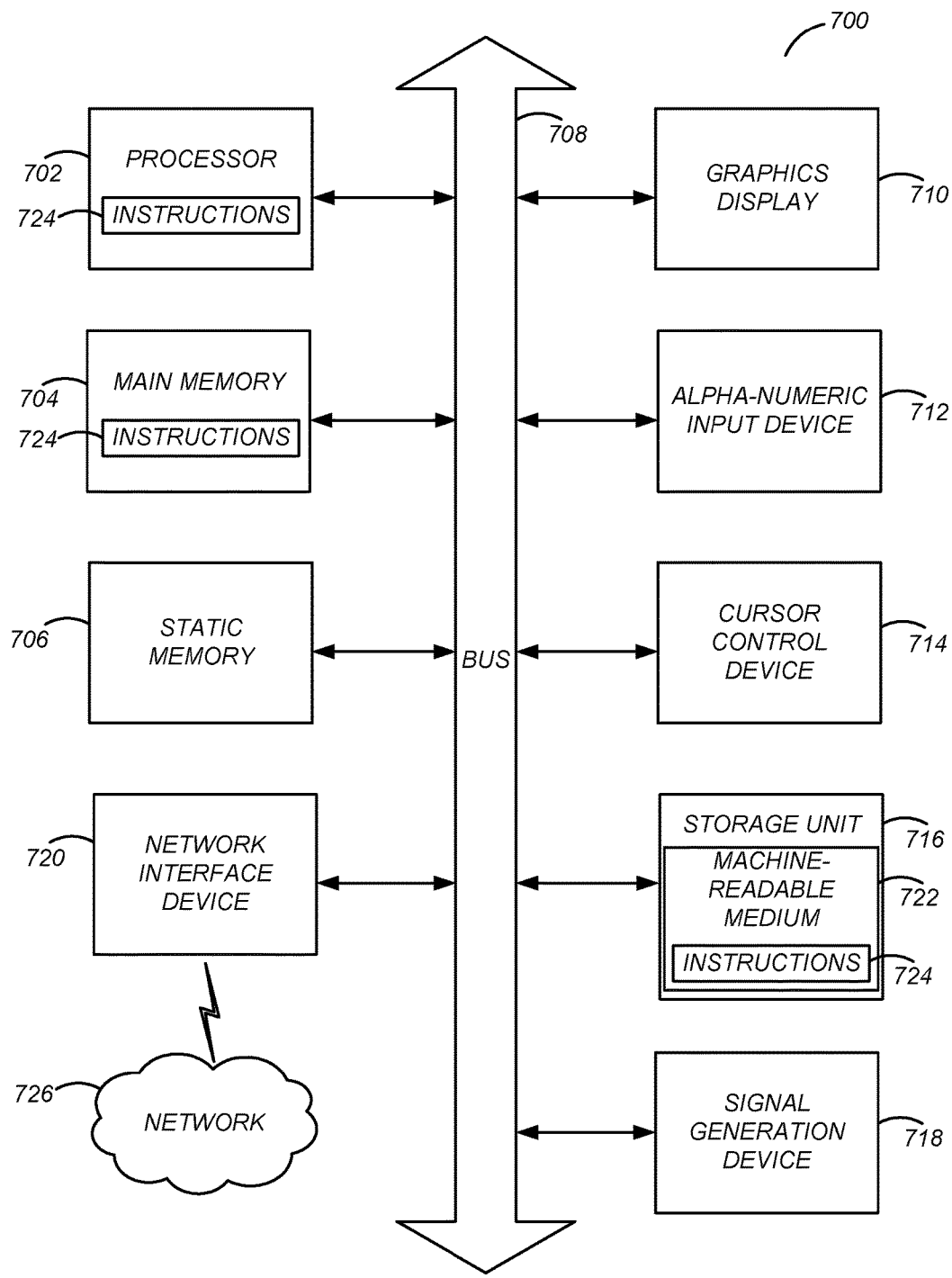
FIG. 7 is a block diagram illustrating components of an example machine able to read instructions from a machine-readable medium and execute them in a processor (or controller).

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 700 is used to execute the processes and functionality described in FIGS. 1-6. It is noted that the computer system 700 is exemplary and that not all the components described herein may be necessary to execute the processes as described above.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704 and the storage unit 716 communicate via a bus 708.

In addition, the computer system 706 can include a static memory 706, a display driver 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The system as disclosed provides benefits and advantages that include the ability to dynamically insert replacement content in a live content stream with variable content break durations. As the durations of content replacement breaks in live content streams are not known beforehand, it may not be possible to pre-select a number of content replacement parts with a combined duration that when inserted into the content replacement break would result in a delay of a listener's content stream that meets a target delay value. However, the system described here is able to insert content into live content streams while targeting a target delay value. This allows live content streams to be customized for individual listeners, but prevents each listener from consuming content that is significantly shifted from content consumed by other listeners of the live content stream.

This has many benefits. For example, in a live sports broadcast, having each listener content stream with a similar listener delay value prevents different listeners from being presented with the same event in the sports broadcast at significantly different times. This, along with allowing streams to be customized, may increase the consumption rate for listeners, benefitting the publisher and/or the content replacement system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-6. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 702) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 724) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 702 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 704). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for dynamically inserting replacement content in a live content stream through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for dynamically inserting additional content items targeting a delay value for a live content stream, comprising:

retrieving, by one or more computing devices, a plurality of regular content replacement parts from a computer storage device, each regular content replacement part being a content item from a third party content provider, each regular content replacement part having durations within a single range of values;

retrieving, by the one or more computing devices, one or more alternative content replacement parts from the computer storage device, each alternative content replacement part being a content item with a duration within one of a plurality of consecutive ranges;

detecting, by the one or more computing devices, a start of a content replacement break in a live content stream that is transmitted to a client device as a listener content stream by detecting a marker embedded within a digital audio data of the live content stream, the listener content stream shifted by a listener delay value from the live content stream, the listener delay value computed by determining a difference in time between the listener content stream and the live content stream, and wherein the live content stream is received from a publisher at the same time as a corresponding content stream is generated;

modifying the waveform of the listener content stream at a first point in the listener content stream corresponding to the content replacement break to insert one or more of the plurality of regular content replacement parts;

detecting an end of the content replacement break for the live content stream;

sorting, by a processor, the one or more alternative content replacement parts in ascending order by an absolute value of the difference between the listener delay value of the listener content stream and a target delay value were the alternative content replacement part inserted into the listener content stream, the target delay value being a previously specified duration of time;

selecting, by a processor, an alternative content replacement part that is a top entry in the sorted one or more alternative content replacement parts;

modifying the waveform of the listener content stream to insert the selected alternative replacement part; and transmitting the listener content stream to the client device.

2. The method of claim 1, wherein the retrieving one or more alternative content replacement parts further comprises:

transmitting a request to an alternative content replacement parts store for alternative content replacement parts, the request including characteristics of the listener and client device, and an indication of the target delay value and the listener delay value; and receiving from the alternative content replacement parts store the one or more alternative content replacement parts, the alternative content replacement parts grouped into one or more sets, each set having alternative content replacement parts within a range of durations, the range of durations selected based on the difference between the target delay value and the listener delay value, the alternative content replacement part selected based on the characteristics of the listener and the client device.

3. The method of claim 1, wherein the alternative content replacement parts within each set are further sorted according to criteria, the criteria including at least one of a difference between the listener delay value and the target delay value, and a value for the alternative content replacement part to the provider of the alternative content replacement part.

4. The method of claim 1, wherein the detecting a start of a content replacement break in a listener content stream comprises:

identifying an audio marker in the listener content stream using spectrum analysis, the audio marker at a frequency range beyond a normal human range of hearing;

determining that the audio marker indicates the start of the content replacement break.

5. The method of claim 1, further comprising:

detecting that the client device is disconnected from the live content stream;

detecting, after a period of time, that the client device has reconnected;

accessing the listener delay value previously stored for the client device; and presenting the listener content stream to the client device shifted from the live content stream by the listener delay value.

6. The method of claim 1, further comprising:

modifying the duration of the content replacement break for the listener content stream by a difference between the listener delay value and the target delay value for the corresponding live content stream, such that the updated listener delay value approaches the target delay value after insertion of the content replacement parts in the content replacement break for the listener content stream.

7. The method of claim 1, further comprising:

subsequent to inserting the alternative content replacement part, determining a difference in time between the listener content stream and the live content stream; and updating the listener delay value with the difference in time between the listener content stream and the live content stream.

8. A system comprising:

a processor;

a non-transitory computer readable storage medium comprising stored instructions for dynamically inserting additional content items targeting a delay value for a live content stream, that when executed by the processor, cause the processor to:

retrieve, by one or more computing devices, a plurality of regular content replacement parts from a computer storage device, each regular content replacement part being a content item from a third party content provider, each regular content replacement part having durations within a single range of values;

retrieve, by the one or more computing devices, one or more alternative content replacement parts from the computer storage device, each alternative content replacement part being a content item with a duration within one of a plurality of consecutive ranges;

detect, by the one or more computing devices, a start of a content replacement break in a live content stream that is transmitted to a client device as a listener content stream by detecting a marker embedded within a digital audio data of the live content stream, the listener content stream shifted by a listener delay value from the live content stream, the listener delay value computed by determining a difference in time between the listener content stream and the live content stream, and wherein the live content stream is received from a publisher at the same time as a corresponding content stream is generated;

modify the waveform of the listener content stream at a first point in the listener content stream corresponding to the content replacement break to insert one or more of the plurality of regular content replacement parts;

detect an end of the content replacement break for the live content stream;

sort the one or more alternative content replacement parts in ascending order by an absolute value of the difference between the listener delay value of the listener content stream and a target delay value were the alternative content replacement part inserted into the listener content stream, the target delay value being a previously specified duration of time;

select an alternative content replacement part that is a top entry in the sorted one or more alternative content replacement parts;

modify the waveform of the listener content stream to insert the selected alternative replacement part; and transmit the listener content stream to the client device.

9. The system of claim 8, comprising further stored instructions, that when executed by the processor, cause the processor to:

transmit a request to an alternative content replacement parts store for alternative content replacement parts, the request including characteristics of the listener and client device, and an indication of the target delay value and the listener delay value; and receive from the alternative content replacement parts store the one or more alternative content replacement parts, the alternative content replacement parts grouped into one or more sets, each set having alternative content replacement parts within a range of durations, the range of durations selected based on the difference between the target delay value and the listener delay value, the alternative content replacement part selected based on the characteristics of the listener and the client device.

10. The system of claim 8, wherein the alternative content replacement parts within each set are further sorted according to criteria, the criteria including at least one of a difference between the listener delay value and the target delay value, and a value for the alternative content replacement part to the provider of the alternative content replacement part.

11. The system of claim 8, comprising further stored instructions, that when executed by the processor, cause the processor to:
identify an audio marker in the listener content stream using spectrum analysis, the audio marker at a frequency range beyond a normal human range of hearing;
determine that the audio marker indicates the start of the content replacement break.

12. The system of claim 8, comprising further stored instructions, that when executed by the processor, cause the processor to:
detect that the client device is disconnected from the live content stream;
detect, after a period of time, that the client device has reconnected;
access the listener delay value previously stored for the client device; and
preset the listener content stream to the client device shifted from the live content stream by the listener delay value.

13. The system of claim 8, comprising further stored instructions, that when executed by the processor, cause the processor to:
modify the duration of the content replacement break for the listener content stream by a difference between the listener delay value and the target delay value for the corresponding live content stream, such that the updated listener delay value approaches the target delay value after insertion of the content replacement parts in the content replacement break for the listener content stream.

14. The system of claim 8, comprising further stored instructions, that when executed by the processor, cause the processor to:
subsequent to the insertion of the alternative content replacement part, determine a difference in time between the listener content stream and the live content stream;
update the listener delay value with the difference in time between the listener content stream and the live content stream.

15. A non-transitory computer storage readable medium for dynamically inserting additional content items targeting a delay value for a live content stream comprising stored instructions, the instructions that when executed by a processor cause the processor to:
retrieve, by one or more computing devices, a plurality of regular content replacement parts from a computer storage device, each regular content replacement part being a content item from a third party content provider, each regular content replacement part having durations within a single range of values;
retrieve, by the one or more computing devices, one or more alternative content replacement parts from the computer storage device, each alternative content replacement part being a content item with a duration within one of a plurality of consecutive ranges;
detect, by the one or more computing devices, a start of a content replacement break in a live content stream that is transmitted to a client device as a listener content stream by detecting a marker embedded within a digital audio data of the live content stream, the listener content stream shifted by a listener delay value from the live content stream, the listener delay value computed by determining a difference in time between the listener content stream and the live content stream, and wherein the live content stream is received from a publisher at the same time as a corresponding content stream is generated;
modify the waveform of the listener content stream at a first point in the listener content stream corresponding to the content replacement break to insert one or more of the plurality of regular content replacement parts;
detect an end of the content replacement break for the live content stream;
sort the one or more alternative content replacement parts in ascending order by an absolute value of the difference between the listener delay value of the listener content stream and a target delay value were the alternative content replacement part inserted into the listener content stream, the target delay value being a previously specified duration of time;
select an alternative content replacement part that is a top entry in the sorted one or more alternative content replacement parts;
modify the waveform of the listener content stream to insert the selected alternative replacement part; and
transmit the listener content stream to the client device.

16. The non-transitory computer storage readable medium of claim 15, comprising further stored instructions, that when executed by the processor, cause the processor to:
transmit a request to an alternative content replacement parts store for alternative content replacement parts, the request including characteristics of the listener and client device, and an indication of the target delay value and the listener delay value; and
receive from the alternative content replacement parts store the one or more alternative content replacement parts, the alternative content replacement parts grouped into one or more sets, each set having alternative content replacement parts within a range of durations, the range of durations selected based on the difference between the target delay value and the listener delay value, the alternative content replacement part selected based on the characteristics of the listener and the client device.

17. The non-transitory computer storage readable medium of claim 15, wherein the alternative content replacement parts within each set are further sorted according to criteria, the criteria including at least one of a difference between the listener delay value and the target delay value, and a value for the alternative content replacement part to the provider of the alternative content replacement part.

18. The non-transitory computer storage readable medium of claim 15, comprising further stored instructions, that when executed by the processor, cause the processor to:
identify an audio marker in the listener content stream using spectrum analysis, the audio marker at a frequency range beyond a normal human range of hearing;

determine that the audio marker indicates the start of the content replacement break.

19. The non-transitory computer storage readable medium of claim 15, comprising further stored instructions, that when executed by the processor, cause the processor to:
modify the duration of the content replacement break for the listener content stream by a difference between the listener delay value and the target delay value for the corresponding live content stream, such that the updated listener delay value approaches the target delay value after insertion of the content replacement parts in the content replacement break for the listener content stream.

20. The non-transitory computer storage readable medium of claim 15, comprising further stored instructions, that when executed by the processor, cause the processor to:
subsequent to the insertion of the alternative content replacement part, determine a difference in time between the listener content stream and the live content stream;
update the listener delay value with the difference in time between the listener content stream and the live content stream.

* * * * *